(12) United States Patent
Tamaizumi

(10) Patent No.: US 11,897,554 B2
(45) Date of Patent: Feb. 13, 2024

(54) TURNING CONTROL SYSTEM

(71) Applicant: JTEKT CORPORATION, Osaka (JP)

(72) Inventor: Terutaka Tamaizumi, Okazaki (JP)

(73) Assignee: JTEKT CORPORATION, Osaka (JP)

(*) Notice: Subject to any disclaimer, the term of this patent is extended or adjusted under 35 U.S.C. 154(b) by 376 days.

(21) Appl. No.: 16/850,416

(22) Filed: Apr. 16, 2020

(65) Prior Publication Data

US 2020/0339187 A1 Oct. 29, 2020

(30) Foreign Application Priority Data

Apr. 26, 2019 (JP) ................ 2019-086315

(51) Int. Cl.
*B62D 5/04* (2006.01)
*B62D 6/02* (2006.01)
*B62D 15/02* (2006.01)

(52) U.S. Cl.
CPC ............. *B62D 5/0463* (2013.01); *B62D 6/02* (2013.01); *B62D 15/021* (2013.01)

(58) Field of Classification Search
CPC ...... B62D 5/0463; B62D 6/02; B62D 15/021; B62D 6/002; B62D 6/007; B62D 6/008; B62D 5/046
USPC ........................................................ 180/443
See application file for complete search history.

(56) References Cited

U.S. PATENT DOCUMENTS

| 6,178,365 | B1 | 1/2001 | Kawagoe et al. |
| 2006/0122751 | A1 | 6/2006 | Oyama et al. |
| 2011/0266760 | A1* | 11/2011 | Itabashi ............ B60W 30/188 280/5.507 |
| 2019/0092384 | A1* | 3/2019 | Kodera ............... B62D 1/166 |
| 2020/0339188 | A1* | 10/2020 | Tamaizumi .......... B62D 5/0484 |

FOREIGN PATENT DOCUMENTS

| EP | 1630069 A2 | 3/2006 |
| EP | 1705101 A1 | 9/2006 |
| JP | 2006-175940 A | 7/2006 |

OTHER PUBLICATIONS

Sep. 16, 2020 Search Report issued in European Patent Application No. 20170832.8.

* cited by examiner

*Primary Examiner* — Scott A Reinbold
(74) *Attorney, Agent, or Firm* — Oliff PLC

(57) ABSTRACT

A turning control system includes an electronic control unit. The electronic control unit is configured to perform: a steering operation amount calculating process of calculating a steering operation amount; an angle command value calculating process of calculating an angle command value; an angle operation amount calculating process of calculating an angle operation amount; an operation process of operating a drive circuit of an electric motor; an adjustment process of adjusting a magnitude of a value obtained by subtracting the angle operation amount which is reflected in the operation process from the angle operation amount; and a correction process of correcting a magnitude of an input when the angle command value is calculated in the angle command value calculating process to be less when the magnitude of the subtracted value is great than when the magnitude of the subtracted value is small.

8 Claims, 9 Drawing Sheets

TURNING CONTROL SYSTEM

CROSS-REFERENCE TO RELATED APPLICATION

This application claims priority to Japanese Patent Application No. 2019-086315 filed on Apr. 26, 2019, incorporated herein by reference in its entirety.

BACKGROUND

1. Technical Field

The disclosure relates to a turning control system that controls a turning actuator having an electric motor incorporated thereinto and turning a turning wheel.

2. Description of Related Art

For example, Japanese Patent Application Publication No. 2006-175940 (JP 2006-175940 A) discloses a device that operates an electric motor which is incorporated into a turning actuator which turns turning wheels based on an operation amount in feedback control based on a difference between a target steering torque and an actual steering torque and an operation amount in feedback control based on a difference between a target turning angle and a turning angle.

SUMMARY

When a turning angle is controlled to a target turning angle by feedback control as described above, reverse input vibration from the turning wheels can be suppressed, but there is concern that a driver will not be able to be made aware of road-surface state information (road information).

According to an aspect of the disclosure, there is provided a turning control system including an electronic control unit, and the turning control system operates a turning actuator that includes an electric motor incorporated thereinto and turns turning wheels. The electronic control unit is configured to perform: a steering operation amount calculating process of calculating a steering operation amount which is an operation amount which is convertible to a torque required for the electric motor as an operation amount of the electric motor for turning the turning wheels to control a steering torque which is input by a driver to a target steering torque by feedback control; an angle command value calculating process of calculating an angle command value which is a command value of a convertible angle which is convertible to a turning angle of the turning wheels based on the steering operation amount; an angle operation amount calculating process of calculating an angle operation amount which is an operation amount which is convertible to a torque required for the electric motor as an operation amount for controlling the convertible angle to the angle command value by feedback control; an operation process of operating a drive circuit of the electric motor to control the torque of the electric motor; an adjustment process of adjusting a magnitude of a value obtained by subtracting the angle operation amount which is reflected in the operation process from the angle operation amount which is calculated in the angle operation amount calculating process and inputting the angle operation amount after adjustment to the operation process; and a correction process of correcting a magnitude of an input when the angle command value is calculated in the angle command value calculating process to be less when the magnitude of the subtracted value is great than when the magnitude of the subtracted value is small.

In this configuration, the magnitude of the value which is obtained by subtracting the angle operation amount reflected in the operation process from the angle operation amount calculated in the angle operation amount calculating process is adjusted in the adjustment process. Here, since the angle operation amount is an operation amount for controlling the convertible angle to the angle command value by feedback control regardless of a road-surface state, the angle operation amount includes an amount for cancelling road-surface state information. Accordingly, the subtracted value includes the amount for cancelling road-surface state information. Accordingly, a driver can be made aware of road-surface state information depending on the magnitude of the subtracted value.

The angle operation amount which is calculated in the angle operation amount calculating process is an operation amount which is suitable for the angle command value. Accordingly, when the angle operation amount serving as an input of the operation process is insufficient for the angle operation amount calculated in the angle operation amount calculating process, there is concern that the convertible angle may greatly diverge from the angle command value. When the convertible angle greatly diverges from the angle command value, the absolute value of the angle operation amount calculated in the angle operation amount calculating process increases excessively and the convertible angle is no longer a value suitable for the angle command value. Therefore, in the above-mentioned configuration, by correcting the input of the angle operation amount calculating process based on the subtracted value, it is possible to cause the angle command value to approach the convertible angle and to curb an excessive increase of the absolute value of the angle operation amount.

In the aspect, the adjustment process may be a process of adjusting a value obtained by dividing the angle operation amount which is reflected in the operation process by the angle operation amount which is calculated in the angle operation amount calculating process (M50) in a range of from 0 to 1.

In this configuration, the magnitude of the value obtained by subtracting the angle operation amount reflected in the operation process from the angle operation amount calculated in the angle operation amount calculating process can be adjusted based on the magnitude of a predetermined coefficient.

In the aspect, the angle operation amount calculating process may be a process of calculating the angle operation amount based on a sum of a feed-forward operation amount which is an operation amount for feed-forward control to the angle command value and an estimated disturbance torque which is an output of a disturbance observer based on a difference between the convertible angle and the angle command value. The adjustment process may be a process of adjusting a magnitude of an input when the angle command value is calculated in the angle command value calculating process based on a value obtained by subtracting the estimated disturbance torque which is reflected in the operation process from the estimated disturbance torque which is reflected in an output of the angle operation amount calculating process.

The estimated disturbance torque is an amount which is obtained by excluding at least a feed-forward operation amount out of the torque affecting the turning angle. Accordingly, by using the feed-forward operation amount as an amount for controlling the convertible angle to the angle command value with high accuracy in reflection of an influence of a factor other than a factor affecting the turning angle outside the vehicle, the estimated disturbance torque can be used as an amount for expressing road-surface state information with high accuracy.

In the aspect, the operation process may include a process of controlling a torque of the electric motor based on the angle operation amount regardless of the steering operation amount. In the aspect, the angle command value calculating process may include a change process of changing a relationship of an output with the input based on the magnitude of the subtracted value.

When the subtracted value is great and the angle operation amount calculating process is not sufficiently reflected in control of the turning angle, there is concern that stability of the angle command value calculating process may be damaged. Therefore, in the above-mentioned configuration, by changing the relationship of the output with the input of the angle command value calculating process based on the magnitude of the subtracted value, the relationship of the output with the input can be used as a relationship capable of curbing a decrease in stability even when the angle operation amount calculating process is not reflected in control of the turning angle.

In the aspect, the adjustment process may include a process of decreasing the magnitude of the subtracted value when a vehicle speed is high in comparison with a case in which the vehicle speed is low. When the vehicle speed is high, reverse input vibration which is generated at the time of straight braking or the like is likely to increase and stability in traveling of the vehicle is likely to be damaged. Therefore, in the above-mentioned configuration, by decreasing the magnitude of the subtracted value when the vehicle speed is high, it is possible to cancel reverse input from the turning wheels side and to secure stability in traveling of the vehicle. By increasing the magnitude of the subtracted value when the vehicle speed is low, it is possible to make a driver aware of road-surface state information.

In the aspect, the electronic control unit may be configured to perform a detection process of detecting a sideslip of the vehicle, and the adjustment process may include a process of increasing the magnitude of the subtracted value when a sideslip is detected in the detection process in comparison with a case in which a sideslip is not detected.

In this configuration, when a sideslip is detected, it is possible to make a driver aware that a road surface on which the vehicle is currently traveling is a road surface on which a sideslip is likely to occur by increasing the magnitude of the subtracted value.

In the aspect, the electronic control unit may be configured to perform an acquisition process of acquiring a request signal from a driver, and the adjustment process may include a process of increasing the subtracted value based on the request signal acquired in the acquisition process.

In this configuration, since the subtracted value can be adjusted based on a request from a driver, it is possible to realize a feeling of steering corresponding to the driver's preference.

In the aspect, the electronic control unit may be configured to perform a target steering torque calculating process of calculating the target steering torque based on a sum of amounts which are obtained by converting the steering operation amount and the steering torque to an amount of force acting on the same object.

Since the steering operation amount can be converted to a torque required for the electric motor, a force which is applied from the vehicle side to turn the turning wheels is determined based on the steering operation amount and the steering torque, and this force can be converted to a lateral force. On the other hand, a target steering torque which is required for improving a feeling of steering for a driver is likely to be determined based on the lateral force. Accordingly, with the above-mentioned configuration, it is possible to easily design the target steering torque calculating process by determining the target steering torque based on the sum of the steering operation amount and the force.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
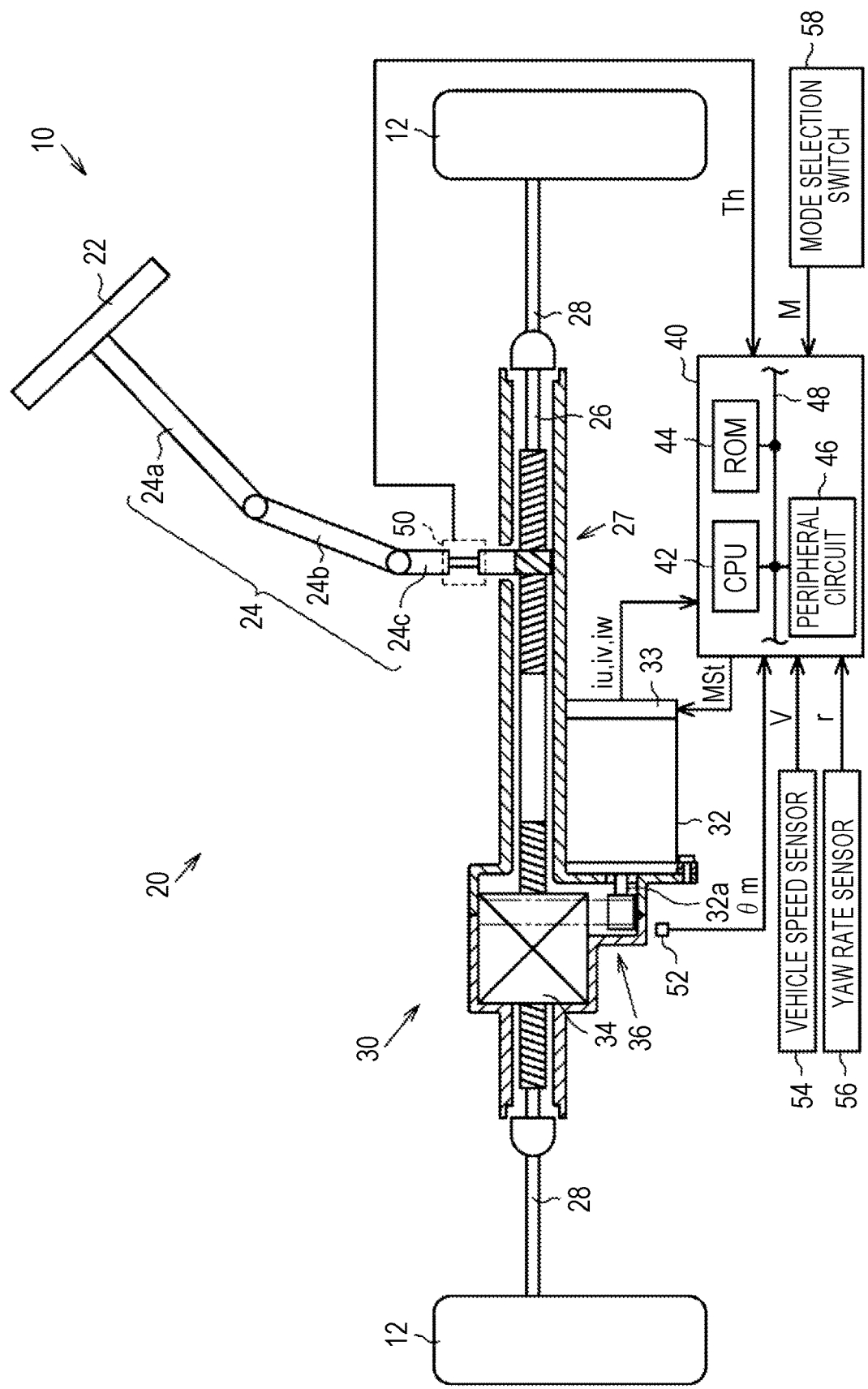
FIG. 1 is a diagram illustrating an electric power steering system according to a first embodiment.

Hereinafter, a turning control system according to a first embodiment will be described with reference to the accompanying drawings. As illustrated in FIG. 1, an electric power steering system 10 includes a steering mechanism 20 that turns turning wheels 12 based on a driver's operation of a steering wheel 22 and a turning actuator 30 that electrically turns the turning wheels 12.

The steering mechanism 20 includes a steering wheel 22, a steering shaft 24 that is fixed to the steering wheel 22, and a rack and pinion mechanism 27. The steering shaft 24 includes a column shaft 24*a* that is connected to the steering wheel 22, an intermediate shaft 24*b* that is connected to a bottom end of the column shaft 24*a*, and a pinion shaft 24*c* that is connected to a bottom end of the intermediate shaft 24*b*. A bottom end of the pinion shaft 24*c* is connected to a rack shaft 26 via the rack and pinion mechanism 27. Right and left turning wheels 12 are connected to both ends of the rack shaft 26 via tie rods 28. Accordingly, a rotational motion of the steering wheel 22, that is, the steering shaft 24, is converted to a translational motion in an axial direction (a right-left direction in FIG. 1) of the rack shaft 26 via the rack and pinion mechanism 27 including the pinion shaft 24c and the rack shaft 26. The translational motion is transmitted to the turning wheels 12 via the tie rods 28 connected to both ends of the rack shaft 26, whereby a turning angle of the turning wheels 12 is changed.

On the other hand, the turning actuator 30 shares the rack shaft 26 with the steering mechanism 20 and includes an electric motor 32, an inverter 33, a ball screw mechanism 34, and a belt type reduction gear mechanism 36. The electric motor 32 is a source of power for turning the turning wheels 12 and, for example, a three-phase surface-magnet synchronous electric motor (SPMSM) can be used as the electric motor 32 in this embodiment. The ball screw mechanism 34 is integrally attached to the surrounding the rack shaft 26 and the belt type reduction gear mechanism 36 transmits a rotational force of an output shaft 32a of the electric motor 32 to the ball screw mechanism 34. The rotational force of the output shaft 32a of the electric motor 32 is converted to a force for translating the rack shaft 26 in the axial direction via the belt type reduction gear mechanism 36 and the ball screw mechanism 34. The turning wheels 12 can be turned by the force in the axial direction which is applied to the rack shaft 26.

A turning control system 40 controls the turning wheels 12 and operates the turning actuator 30 to control a turning angle which is a control parameter thereof. The turning control system 40 controls the control parameter with reference to a steering torque Th which is a torque input via the steering wheel 22 by a driver and detected by a torque sensor 50, a rotational angle θm of the output shaft 32a which is detected by a rotational angle sensor 52, or currents iu, iv, and iw flowing in the electric motor 32. The currents iu, iv, and iw can be detected as voltage drop provided in a shunt resistor which is provided in each leg of the inverter 33. The turning control system 40 refers to a vehicle speed V which is detected by a vehicle speed sensor 54, a yaw rate γ which is detected by a yaw rate sensor 56, or an operation state of a mode selection switch 58 on which a traveling mode selecting operation is performed by a driver. In this embodiment, the mode selection switch 58 is a switch that selects a normal mode or a sports mode. The sports mode is a mode in which a rotational speed of an onboard electric motor at the same vehicle speed is set to be higher than that in the normal mode.

The turning control system 40 includes a CPU 42, a ROM 44, and a peripheral circuit 46, which are connected to each other via a communication line 48. The peripheral circuit 46 includes a circuit that generates a clock signal for defining internal operations, a power supply circuit, and a reset circuit. In other words, the turning control system 40 includes an electronic control unit.

Figure 2:
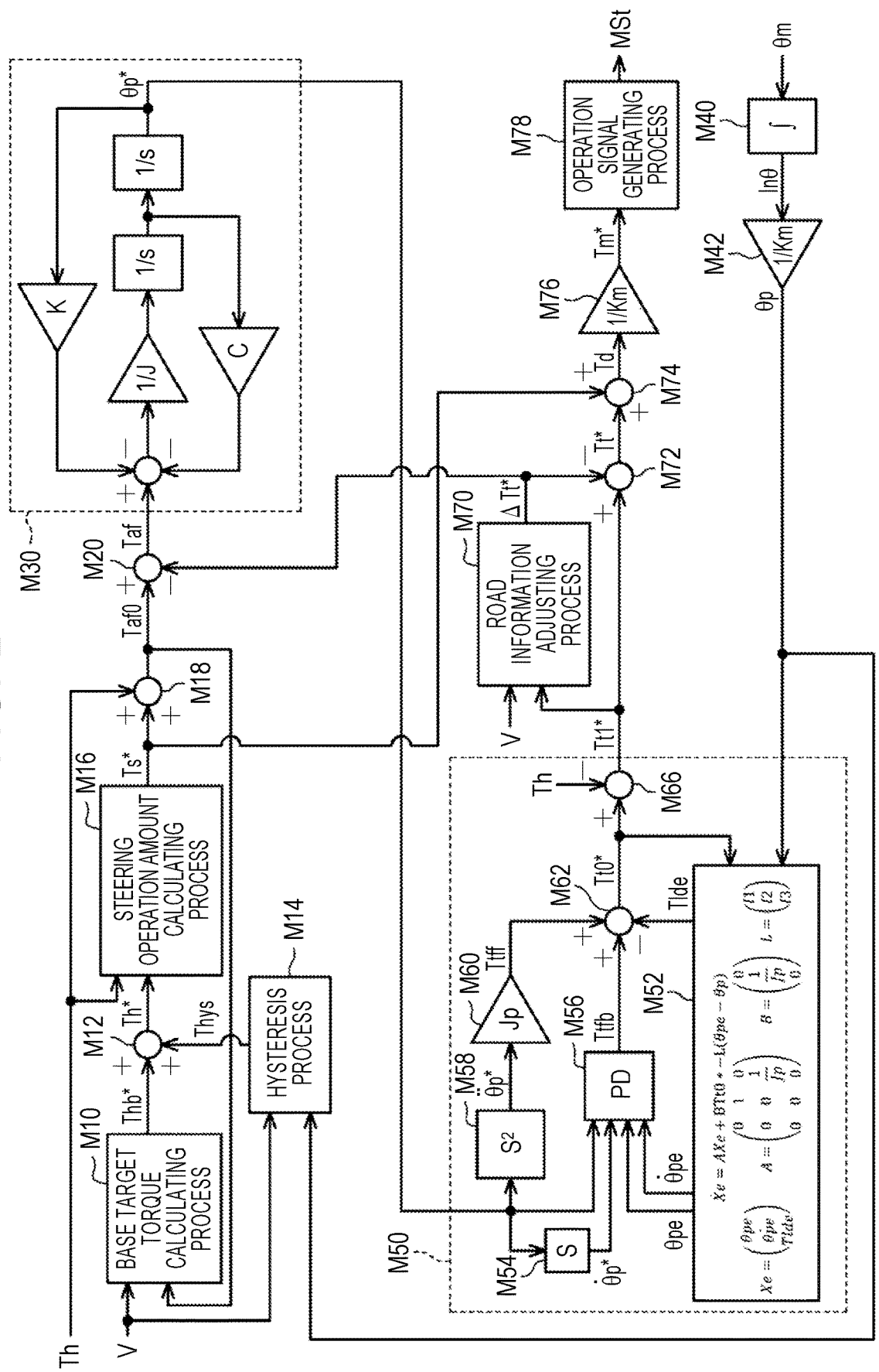
FIG. 2 is a block diagram illustrating processes which are performed by a turning control system according to the first embodiment.

FIG. 2 illustrates some processes which are performed by the turning control system 40. The processes illustrated in FIG. 2 are realized by causing the CPU 42 to execute a program stored in the ROM 44. A base target torque calculating process M10 is a process of calculating a base target torque Thb* which is a base value of a target steering torque Th* which is to be input to the steering shaft 24 by a driver via the steering wheel 22 based on an axial force Taf0. Here, the axial force Taf0 is a force in an axial direction which is applied to the rack shaft 26. Since the axial force Taf0 is an amount corresponding to a lateral force acting on the turning wheels 12, the lateral force can be ascertained from the axial force Taf0. On the other hand, a torque which is to be input to the steering shaft 24 by a driver via the steering wheel 22 is preferably determined based on the lateral force. Accordingly, the base target torque calculating process M10 is a process of calculating the base target torque Thb* based on the lateral force which is ascertained from the axial force Taf0.

Specifically, the base target torque calculating process M10 is a process of calculating the magnitude of the base target torque Thb* to be less when the magnitude (the absolute value) of the axial force Taf0 is the same and the vehicle speed V is low than when the vehicle speed V is high. This can be realized, for example, by causing the CPU 42 to map-calculate the base target torque Thb* in a state in which map data with the axial force Taf0 or the lateral acceleration and the vehicle speed V which are ascertained from the axial force Taf0 as input variables and with the base target torque Thb* as an output variable is stored in the ROM 44 in advance. Here, map data is pair data of discrete values of the input variables and values of the output variables corresponding to the values of the input variables. For example, the map calculation is a process of outputting the value of the corresponding output variable of the map data as a result of calculation when a value of one input variable matches one of the values of the input variables of the map data and outputting a value obtained by interpolation of values of a plurality of output variables included in the map data as a result of calculation when the value of one input variable does not match one value of the input variables.

A hysteresis process M14 is a process of calculating and outputting a hysteresis correction amount Thys for correcting the base target torque Thb* based on a rotational angle of the pinion shaft 24c (a pinion angle θp) which is a convertible angle which can be converted to the turning angle of the turning wheels 12. Specifically, the hysteresis process M14 includes a process of identifying switching forward and switching back of the steering wheel 22 based on a change of the pinion angle θp or the like and calculating a hysteresis correction amount Thys such that the magnitude (the absolute value) of the target steering torque Th* is greater at the time of switching forward than at the time of switching back. More specifically, the hysteresis process M14 includes a process of setting the hysteresis correction amount Thys to be variable based on the vehicle speed V.

An addition process M12 is a process of calculating the target steering torque Th* by adding the hysteresis correction amount Thys to the base target torque Thb*. A steering operation amount calculating process M16 is a process of calculating a steering operation amount Ts* which is an operation amount for controlling a steering torque Th to the target steering torque Th* by feedback control. The steering operation amount Ts* is an amount including an operation amount for controlling the steering torque Th to the target steering torque Th* by feedback control and may include a feed-forward term. An operation amount for feedback control is an amount for increasing the magnitude (the absolute value) of a required torque for the electric motor 32, for example, when signs of both the steering torque Th and the target steering torque Th* are positive and the steering torque Th is greater than the target steering torque Th*. The steering operation amount Ts* is an amount corresponding to the required torque Td for the electric motor 32 in feedback control of the steering torque Th to the target steering torque Th*, and the steering operation amount Ts* is an amount which has been converted to a torque which is applied to the steering shaft 24 in this embodiment.

An axial force calculating process M18 is a process of calculating the axial force Taf0 by adding the steering torque Th to the steering operation amount Ts*. Since the steering torque Th is a torque which is applied to the steering shaft 24, the axial force Taf0 in this embodiment has a value obtained by converting a force which is applied to the rack shaft 26 in the axial direction to a torque which is applied to the steering shaft 24.

A subtraction process M20 is a process of calculating the axial force Taf by subtracting an adjustment amount ΔTt* from the axial force Taf0. A normative model calculating process M30 is a process of calculating a pinion angle command value θp* which is a command value of the pinion angle θp based on the axial force Taf. Specifically, the normative model calculating process M30 is a process of calculating the pinion angle command value θp* using a model formula which is expressed by Expression (c1).

$$Taf = K \cdot \theta p^* + C \cdot \theta p^{*\prime} + J \cdot \theta p^{*\prime\prime} \quad (c1)$$

The model expressed by Expression (c1) is a model of a value indicated by the pinion angle θp when the same amount of torque as the axial force Taf is input to the steering shaft 24. In Expression (c1), a stickiness coefficient C is a model of friction of the electric power steering system 10 or the like, an inertia coefficient J is a model of an inertia of the electric power steering system 10, and an elasticity coefficient K is a model of specifications such as suspension, wheel alignment, and the like of a vehicle in which the electric power steering system 10 is mounted. This model is not a model that accurately expresses the actual electric power steering system or the vehicle in which the electric power steering system 10 is mounted, but is a normative model which is designed to change behavior of the turning angle with an input to ideal behavior. In this embodiment, it is possible to adjust a feeling of steering by designing a normative model.

An integration process M40 is a process of calculating an integrated value Inθ of a rotational angle θm of the electric motor 32. In this embodiment, the turning angle of the turning wheels 12 when the vehicle moves straightly is set to "0" and the integrated value Inθ when the turning angle is "0" is set to "0." A conversion process M42 is a process of calculating the pinion angle θp by dividing the integrated value Inθ by a reduction gear ratio Km from the steering shaft 24 to the electric motor 32. The pinion angle θp represents a straight traveling direction when it is "0" and represents a right turning angle or a left turning angle depending on whether it is positive or negative.

An angle operation amount calculating process M50 is a process of calculating an angle operation amount Tt1* which is an operation amount for controlling the pinion angle θp to the pinion angle command value θp* by feedback control. The angle operation amount Tt1* is an amount corresponding to the required torque Td for the electric motor 32 in feedback control of the pinion angle θp to the pinion angle command value θp*, and is an amount which is converted to a torque which is applied to the steering shaft 24 in this embodiment.

The angle operation amount calculating process M50 includes a disturbance observer M52 of estimating a torque affecting the pinion angle θp as a disturbance torque in addition to the angle operation amount Tt1* and the steering torque Th and setting it as an estimated disturbance torque Tlde. In this embodiment, the estimated disturbance torque Tlde is converted to a torque which is applied to the steering shaft 24.

The disturbance observer M52 calculates the estimated disturbance torque Tlde or an estimated value θpe by Expression (c2) using an inertia coefficient Jp, the estimated value θpe of the pinion angle θp, the angle operation amount Tt0*, and a matrix L of three rows and one column for defining observer gains l1, l2, and l3. The inertia coefficient Jp is a model of an inertia of the electric power steering system 10 and represents the actual inertia of the electric power steering system 10 with higher accuracy than that of the inertia coefficient J.

$$\dot{X}e = AXe + BTt0 - L(\theta pe - \theta p) \quad \dots (c2)$$

$$Xe = \begin{pmatrix} \theta pe \\ \hat{\theta pe} \\ Tlde \end{pmatrix}$$

$$A = \begin{pmatrix} 0 & 1 & 0 \\ 0 & 0 & \frac{1}{Jp} \\ 0 & 0 & 0 \end{pmatrix}$$

$$B = \begin{pmatrix} 0 \\ \frac{1}{Jp} \\ 0 \end{pmatrix}$$

$$L = \begin{pmatrix} l1 \\ l2 \\ l3 \end{pmatrix}$$

A differentiation calculating process M54 is a process of calculating a pinion angular velocity command value by a differentiation calculation of the pinion angle command value θp*.

A feedback term calculating process M56 is a process of calculating a feedback operation amount Ttfb which is a sum of a proportional term based on a difference between the pinion angle command value θp* and the estimated value θpe and a differential term based on a difference between a differential value of the pinion angle command value θp* and a differential value of the estimated value θpe.

A second-order differentiation process M58 is a process of calculating a second-order time differential value of the pinion angle command value θp*. A feed-forward term calculating process M60 is a process of calculating a feed-forward operation amount Ttff by multiplying an output value of the second-order differentiation process M58 by the inertia coefficient Jp. A two-degree-of-freedom operation amount calculating process M62 is a process of calculating an angle operation amount Tt0* by subtracting the estimated disturbance torque Tlde from a sum of the feedback operation amount Ttfb and the feed-forward operation amount Ttff.

A steering torque compensating process M66 is a process of calculating the angle operation amount Tt1* which is an output of the angle operation amount calculating process M50 by subtracting the steering torque Th from the angle operation amount Tt0*. A road information adjusting process M70 is a process of calculating the adjustment amount ΔTt* based on the angle operation amount Tt1*.

A subtraction process M72 is a process of calculating an angle operation amount Tt* by subtracting the adjustment amount ΔTt* from the angle operation amount Tt1*. An addition process M74 is a process of calculating the required torque Td for the electric motor 32 by adding the angle operation amount Tt* to the steering operation amount Ts*. The required torque Td is obtained by converting a torque which is to be generated by the electric motor 32 to the torque of the steering shaft 24.

A conversion process M76 is a process of converting the required torque Td to a torque command value Tm* which is a command value of the torque for the electric motor 32 by dividing the required torque Td by the reduction gear ratio Km.

An operation signal generating process M78 is a process of generating and outputting an operation signal MSt of the inverter 33 for controlling the torque for the electric motor 32 to the torque command value Tm*. The operation signal MSt is actually an operation signal for each arm of each leg of the inverter 33.

Figure 3:
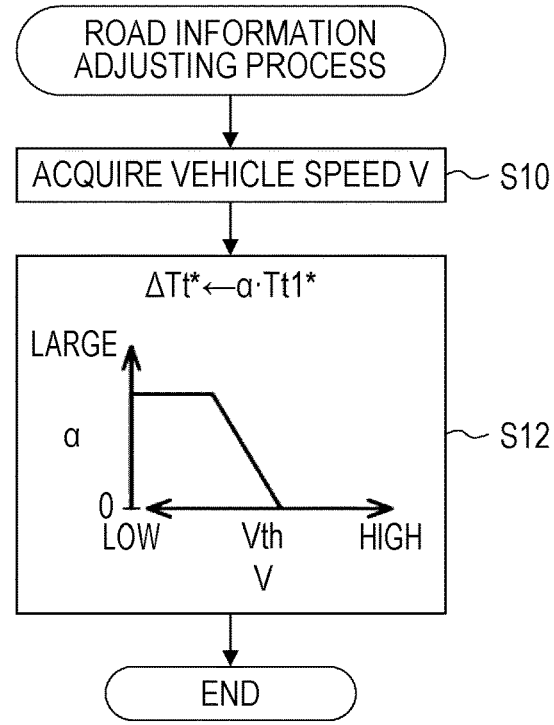
FIG. 3 is a flowchart illustrating a flow of a road information adjusting process according to the first embodiment.

FIG. 3 illustrates a flow of the road information adjusting process M70. The process flow illustrated in FIG. 3 is realized by causing the CPU 42 to repeatedly execute a program stored in the ROM 44, for example, at intervals of a predetermined period. In the following description, a numeral with "S" added to the head thereof denotes a step number of each process.

In a series of processes illustrated in FIG. 3, the CPU 42 first acquires a vehicle speed V (S10). Then, the CPU 42 calculates an adjustment amount $\Delta Tt^*$ by multiplying an angle operation amount $Tt1^*$ by a coefficient $\alpha$ (S12). Here, the CPU 42 sets the coefficient $\alpha$ to "0" when the vehicle speed V is equal to or higher than a predetermined speed Vth, and calculates the coefficient $\alpha$ to be a greater value when the vehicle speed V is lower than the predetermined speed Vth and the vehicle speed V is low than when the vehicle speed V is high. The coefficient $\alpha$ has a value of from "0" to "1." Specifically, the CPU 42 map-calculates the coefficient $\alpha$ in a state in which map data with the vehicle speed V as an input variable and with the coefficient $\alpha$ as an output variable is stored in the ROM 44 in advance.

In addition, when the process of S12 is completed, the CPU 42 temporarily ends the series of processes illustrated in FIG. 3. Operations and advantages in this embodiment will be described below.

When the vehicle speed V is equal to or higher than the predetermined speed Vth, the CPU 42 sets the adjustment amount $\Delta Tt^*$ to "0." Accordingly, the difference between the angle operation amount $Tt1^*$ which is output from the angle operation amount calculating process M50 and the angle operation amount $Tt^*$ which is used to calculate the required torque Td becomes "0." Accordingly, the required torque Td includes an operation amount required for feedback control of the pinion angle $\theta p$ to the pinion angle command value $\theta p^*$ without insufficiency. Here, since the pinion angle command value $\theta p^*$ is determined based on the normative model expressed by Expression (c1), the turning angle is controlled based on the normative model. Accordingly, a reverse input from a road surface on which the vehicle travels is cancelled. When the vehicle speed V is high, reverse input vibration which is generated at the time straight braking or the like is likely to increase and thus stability of traveling is likely to be damaged, but the stability of traveling can be secured by curbing the reverse input vibration.

On the other hand, when the vehicle speed V is lower than the predetermined speed Vth, the adjustment amount $\Delta Tt^*$ is set to be greater as the vehicle speed V decreases. Here, since the adjustment amount $\Delta Tt^*$ includes an amount for cancelling road-surface state information, the road-surface state information is less likely to be cancelled by control as the adjustment amount $\Delta Tt^*$ which is a difference between the angle operation amount $Tt1^*$ and the angle operation amount $Tt^*$ which is reflected in the torque command value Tm* increases. Accordingly, by increasing the magnitude of the adjustment amount $\Delta Tt^*$ as the vehicle speed V decreases, a driver can be made to be more aware of the road-surface state information as the vehicle speed V becomes lower.

The CPU 42 subtracts the adjustment amount $\Delta Tt^*$ which is a value obtained by subtracting the angle operation amount $Tt^*$ from the angle operation amount $Tt1^*$ from the axial force Taf0 and sets the resultant value as the axial force Taf which is an input of the normative model calculating process M30. Accordingly, it is possible to prevent the magnitude of the estimated disturbance torque Tlde from increasing excessively. That is, the angle operation amount $Tt1^*$ which is calculated by the angle operation amount calculating process M50 is an operation amount suitable for controlling the pinion angle $\theta p$ to the pinion angle command value $\theta p^*$. Accordingly, when the value obtained by subtracting the angle operation amount $Tt^*$ from the angle operation amount $Tt1^*$ is not "0," there is concern that the pinion angle $\theta p$ may be greatly separated from the pinion angle command value $\theta p^*$ and the magnitude of the estimated disturbance torque Tlde may increase excessively. In this case, since the angle operation amount $Tt1^*$ departs from the value suitable for controlling the pinion angle $\theta p$ to the pinion angle command value $\theta p^*$, there is concern of a decrease in controllability of the pinion angle $\theta p$ when the angle operation amount $Tt^*$ is controlled to the angle operation amount $Tt1^*$.

According to the embodiment described above, the following advantages are additionally achieved. The target steering torque Th* is set based on the sum of the steering operation amount Ts* and the steering torque Th. Here, a target torque which is required for improving a feeling of steering for a driver is likely to be determined based on a lateral force. On the other hand, since the sum of the steering operation amount Ts* and the steering torque Th can be converted to a lateral force of the vehicle, it is possible to easily design the process of calculating the target steering torque Th* by determining the target steering torque Th* based on the sum.

Second Embodiment

Hereinafter, a second embodiment will be described with reference to the accompanying drawings with a focus on differences from the first embodiment.

Figure 4:
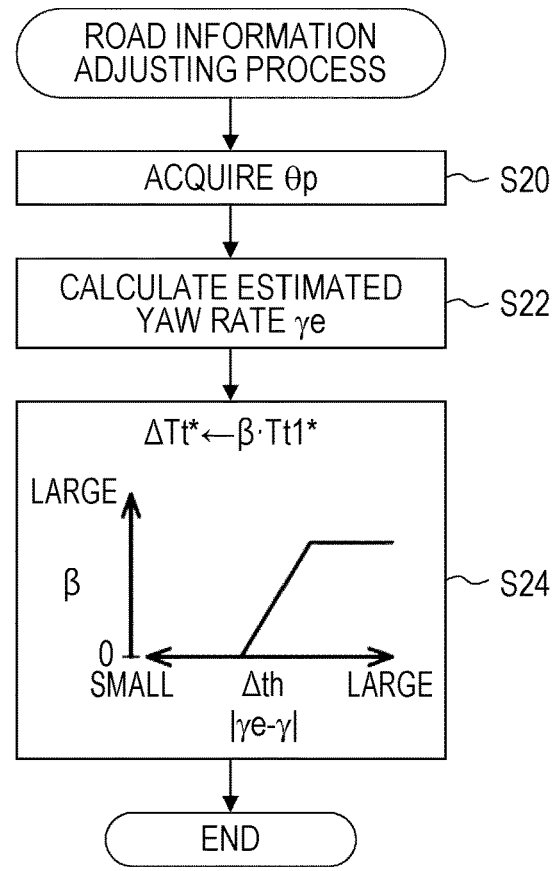
FIG. 4 is a flowchart illustrating a flow of a road information adjusting process according to a second embodiment.

In the first embodiment, the adjustment amount $\Delta Tt^*$ is set to be variable depending on the vehicle speed V, but is set to be variable depending on a degree of sideslip of the vehicle in this embodiment. FIG. 4 illustrates a flow of the road information adjusting process M70 according to this embodiment. The process flow illustrated in FIG. 4 is realized by causing the CPU 42 to repeatedly execute a program stored in the ROM 44, for example, at intervals of a predetermined period.

In a series of processes illustrated in FIG. 4, the CPU 42 first acquires a pinion angle $\theta p$ (S20). Then, the CPU 42 calculates an estimated yaw rate $\gamma e$ based on the pinion angle $\theta p$ (S22). This can be realized, for example, by causing the CPU 42 to map-calculate the estimated yaw rate $\gamma e$ in a state in which map data with the pinion angle $\theta p$ as an input variable and with the estimated yaw rate $\gamma e$ as an output variable is stored in the ROM 44 in advance.

Then, the CPU 42 substitutes a value, which is obtained by multiplying the angle operation amount $Tt1^*$ by a coefficient $\beta$, into the adjustment amount $\Delta Tt^*$ (S24). Here, the CPU 42 sets the coefficient $\beta$ to "0" when the absolute value of a difference between the yaw rate γ and the estimated yaw rate γe is equal to or less than a predetermined value Δth, and sets the coefficient β to be a greater value when the absolute value of the difference is greater than the predetermined value Δth and the absolute value of the difference is great than when the absolute value of the difference is small. The coefficient β has a value of from "0" to "1." Specifically, the CPU 42 map-calculates the coefficient β in a state in which map data with the vehicle speed V as an input variable and with the coefficient β as an output variable is stored in the ROM 44 in advance.

In addition, when the process of S24 is completed, the CPU 42 temporarily ends the series of processes illustrated in FIG. 4. Operations and advantages in this embodiment will be described below.

When the absolute value of the difference between the yaw rate γ and the estimated yaw rate γe is greater than the predetermined value Δth, the CPU 42 increases the magnitude of the value obtained by subtracting the angle operation amount Tt* from the angle operation amount Tt1* as the absolute value of the difference increases. Here, since a sideslip of the vehicle is more likely to occur as the absolute value of the difference increases, it is possible to allow a driver to more easily be aware of road-surface state information as the degree of sideslip increases. Accordingly, it is possible to allow a driver to be aware that the vehicle is traveling on a road surface on which a sideslip is likely to occur.

Third Embodiment

Hereinafter, a third embodiment will be described with reference to the accompanying drawings with a focus on differences from the first embodiment.

Figure 5:
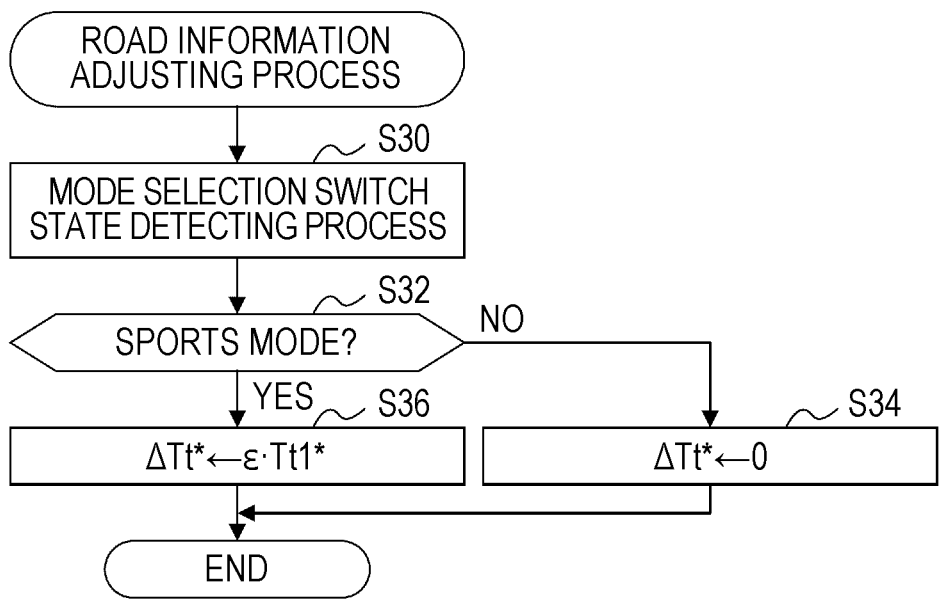
FIG. 5 is a flowchart illustrating a flow of a road information adjusting process according to a third embodiment.

In this embodiment, the adjustment amount ΔTt* is set to be variable depending on the driving mode. FIG. 5 illustrates a flow of the road information adjusting process M70 according to this embodiment. The process flow illustrated in FIG. 5 is realized by causing the CPU 42 to repeatedly execute a program stored in the ROM 44, for example, at intervals of a predetermined period.

In a series of processes illustrated in FIG. 5, the CPU 42 first detects an operation state of the mode selection switch 58 (S30). Then, the CPU 42 determines whether a sports mode is selected based on the state detected in the process of S30 (S32). Then, when it is determined that a normal mode is selected (S32: NO), the CPU 42 substitutes "0" into the adjustment amount ΔTt* (S34). On the other hand, when it is determined that the sports mode is selected (S32: YES), the CPU 42 substitutes a value, which is obtained by multiplying the angle operation amount Tt1* by a coefficient ε, into the adjustment amount ΔTt* (S36). Here, the coefficient ε has a value of from "0" to "1."

In addition, when the processes of S34 and S36 completed, the CPU 42 temporarily ends the series of processes illustrated in FIG. 5. Operations and advantages in this embodiment will be described below.

When the normal mode is selected, the CPU 42 can sufficiently cancel a reverse input from a road surface on which the vehicle is traveling by setting the adjustment amount ΔTt* to "0" and reduce a driving load of a driver. On the other hand, when the sports mode is selected, the CPU 42 can allow a driver to be aware of road-surface state information by setting the magnitude of the adjustment amount ΔTt* to be greater than "0." Since it is conceivable that a driver who likes a sports mode want to be aware of road-surface state information, it is possible to realize a feeling of steering corresponding to the driver's taste.

Fourth Embodiment

Hereinafter, a fourth embodiment will be described with reference to the accompanying drawings with a focus on differences from the third embodiment.

In the third embodiment, the magnitude of the adjustment amount ΔTt* is set to be greater than "0" in the sports mode. Here, when a difference between ε and "1" is small, the angle operation amount calculating process M50 is not sufficiently reflected in control of the turning angle and thus there is concern of self-excited vibration occurring in the normative model calculating process M30. In this case, the absolute value of the difference between the pinion angle command value θp* and the pinion angle θp increases and there is concern of deterioration in controllability of switching at the time of switching to the normal mode. Therefore, in this embodiment, the self-excited vibration is suppressed through the following processes.

Figure 6:
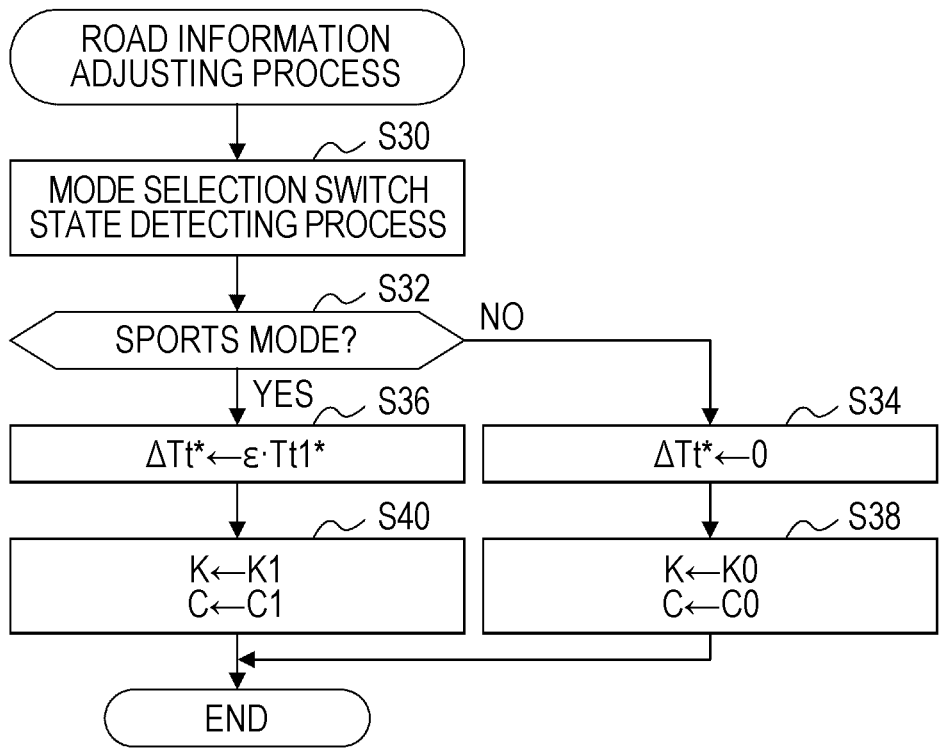
FIG. 6 is a flowchart illustrating a flow of a road information adjusting process according to a fourth embodiment.

FIG. 6 illustrates a flow of the road information adjusting process M70 according to this embodiment. The process flow illustrated in FIG. 6 is realized by causing the CPU 42 to repeatedly execute a program stored in the ROM 44, for example, at intervals of a predetermined period. The processes in FIG. 6 corresponding to the processes illustrated in FIG. 5 are referred to by the same step numbers for the purpose of convenience.

In a series of processes illustrated in FIG. 6, when the process of S34 is completed, the CPU 42 substitutes a normal value K0 into the elasticity coefficient K which is used for the normative model calculating process M30 to calculate the pinion angle command value θp* and substitutes a normal value C0 into the stickiness coefficient C (S38). The normal values K0 and C0 are adapted to values for stabilizing the normative model calculating process M30 when the angle operation amount calculating process M50 is sufficiently reflected in control of the turning angle. On the other hand, when the process of S36 is completed, the CPU 42 substitutes a changed value K1 into the elasticity coefficient K which is used for the normative model calculating process M30 to calculate the pinion angle command value θp* and substitutes a changed value C1 into the stickiness coefficient C (S40). The changed values K1 and C1 are adapted to values for stabilizing the normative model calculating process M30 when the angle operation amount calculating process M50 is not reflected in control of the turning angle.

In addition, when the processes of S38 and S40 completed, the CPU 42 temporarily ends the series of processes illustrated in FIG. 6.

Fifth Embodiment

Hereinafter, a fifth embodiment will be described with reference to the accompanying drawings with a focus on differences from the first embodiment.

Figure 7:
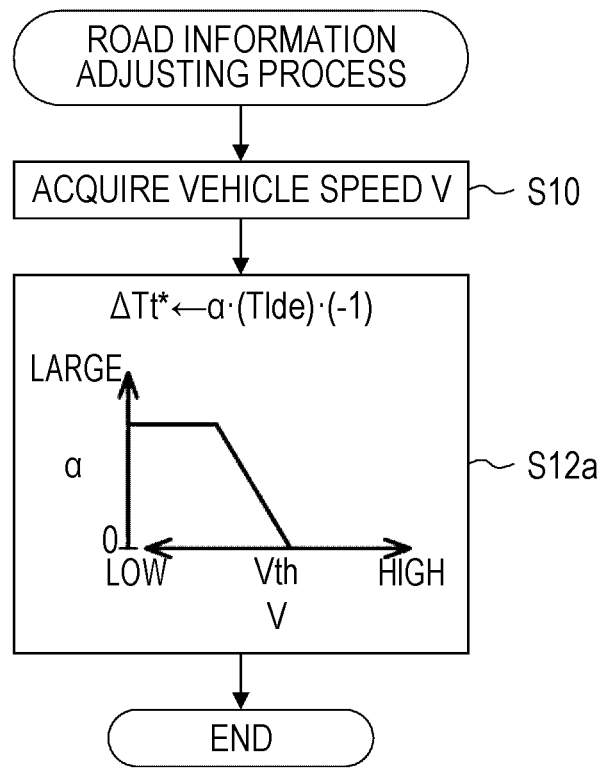
FIG. 7 is a flowchart illustrating a flow of a road information adjusting process according to a fifth embodiment.

FIG. 7 illustrates a flow of the road information adjusting process M70 according to this embodiment. The process flow illustrated in FIG. 7 is realized by causing the CPU 42 to repeatedly execute a program stored in the ROM 44, for example, at intervals of a predetermined period. The processes in FIG. 7 corresponding to the processes illustrated in FIG. 3 are referred to by the same step numbers for the purpose of convenience.

In a series of processes illustrated in FIG. 7, when the process of S10 is completed, the CPU 42 calculates the adjustment amount ΔTt* by multiplying the estimated disturbance torque Tlde by "−1" and the coefficient α (S12a). Here, "−1" is provided to exclude at least a part of the estimated disturbance torque Tlde from the angle operation amount Tt1*. That is, the angle operation amount Tt1* is "Ttff+Ttfb−Tlde−Th." Accordingly, in order to remove all of the contribution of the estimated disturbance torque Tlde from the angle operation amount Tt1*, it is necessary to add the estimated disturbance torque Tlde to the angle operation amount Tt1*. On the other hand, in the subtraction process M72, the adjustment amount ΔTt* is subtracted from the angle operation amount Tt1*. Accordingly, since the adjustment amount ΔTt* needs to have a sign opposite to that of the estimated disturbance torque Tlde, the value obtained by multiplying the estimated disturbance torque Tlde by "−1" is multiplied by the coefficient α in the process of S12a.

The CPU 42 sets the coefficient α to "0" when the vehicle speed V is equal to or higher than a predetermined speed Vth, and calculates the coefficient α to be a greater value when the vehicle speed V is lower than the predetermined speed Vth and the vehicle speed V is low than when the vehicle speed V is high. The coefficient α has a value of from "0" to "1." Specifically, the CPU 42 map-calculates the coefficient α in a state in which map data with the vehicle speed V as an input variable and with the coefficient α as an output variable is stored in the ROM 44 in advance.

In addition, when the process of S12a is completed, the CPU 42 temporarily ends the series of processes illustrated in FIG. 7. Operations and advantages in this embodiment will be described below.

The CPU 42 calculates the adjustment amount ΔTt* based on the estimated disturbance torque Tlde. The estimated disturbance torque Tlde is an amount corresponding to a force which is applied to the turning wheels 12 in addition to the feed-forward operation amount Ttff and the sum of the feedback operation amount Ttfb and the steering torque Th in realizing the current turning angle (the pinion angle θp). Accordingly, in the estimated disturbance torque Tlde, a ratio of an amount based on a road-surface state is greater than that based on the angle operation amount Tt1*. Accordingly, by calculating the adjustment amount ΔTt* based on the estimated disturbance torque Tlde, it is possible to allow a driver to more appropriately be aware of road-surface state information.

Sixth Embodiment

Hereinafter, a sixth embodiment will be described with reference to the accompanying drawings with a focus on differences from the first embodiment.

Figure 8:
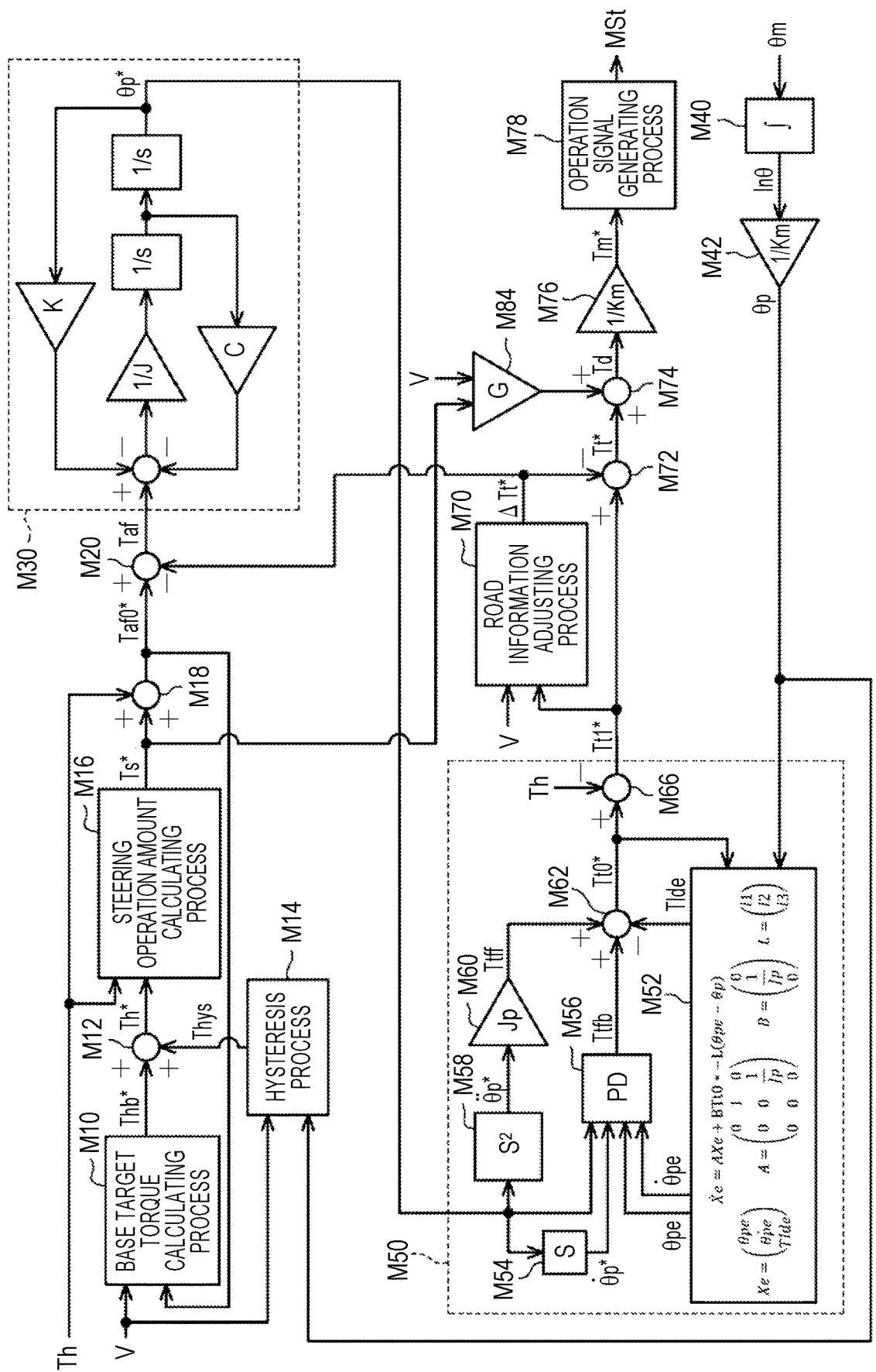
FIG. 8 is a block diagram illustrating processes which are performed by a turning control system according to a sixth embodiment.

FIG. 8 illustrates some processes which are performed by the turning control system 40 according to this embodiment. The process flow illustrated in FIG. 8 is realized by causing the CPU 42 to repeatedly execute a program stored in the ROM 44. The processes in FIG. 8 corresponding to the processes illustrated in FIG. 2 are referred to by the same step numbers for the purpose of convenience.

As illustrated in FIG. 8, in this embodiment, the steering operation amount Ts* which is output from the steering operation amount calculating process M16 is multiplied by a gain G by a gain multiplying process M84 and then the result of multiplication is input to the addition process M74. Accordingly, the required torque Td in this embodiment is "G·Ts*+Tt*."

Figure 9:
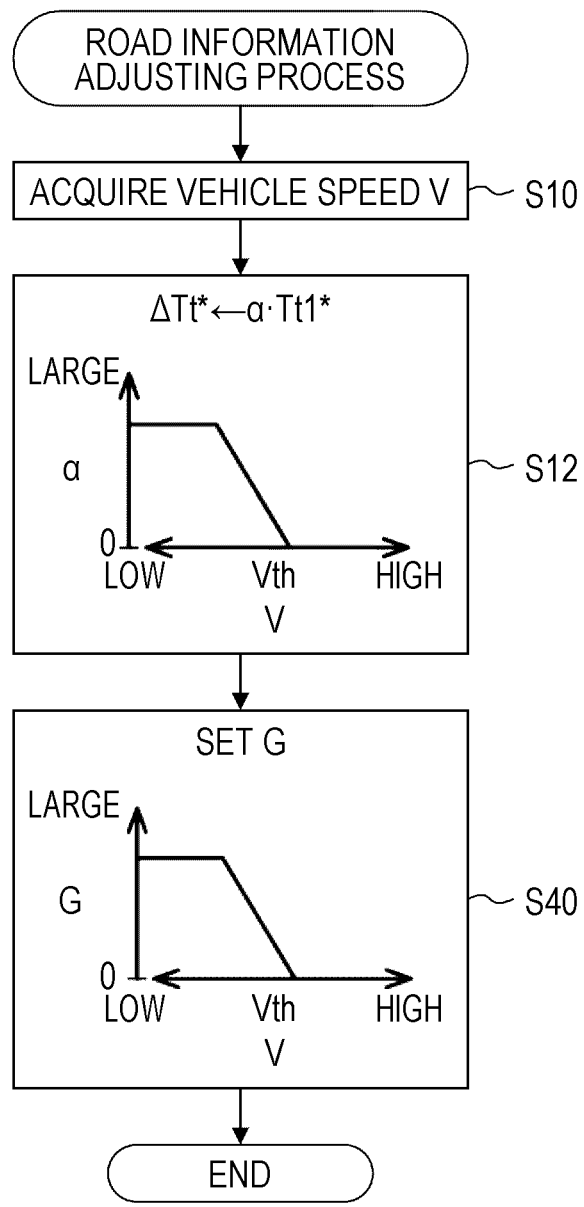
FIG. 9 is a flowchart illustrating a flow of a road information adjusting process according to the sixth embodiment.

FIG. 9 illustrates a flow of the road information adjusting process M70 according to this embodiment. The process flow illustrated in FIG. 9 is realized by causing the CPU 42 to repeatedly execute a program stored in the ROM 44, for example, at intervals of a predetermined period. The processes in FIG. 9 corresponding to the processes illustrated in FIG. 3 are referred to by the same step numbers for the purpose of convenience.

In a series of processes illustrated in FIG. 9, when the process of S12 is completed, the CPU 42 sets the gain G to be variable depending on the vehicle speed V (S40). Specifically, the CPU 42 sets the gain G to "0 when the vehicle speed V is equal to or higher than a predetermined speed Vth, and sets the gain G to be a greater value when the vehicle speed V is lower than the predetermined speed Vth and the vehicle speed V is low than when the vehicle speed V is high. The gain G has a value of from "0" to "1." This is a process for curbing lack of a torque required for control the turning angle.

In addition, when the process of S40 is completed, the CPU 42 temporarily ends the series of processes illustrated in FIG. 9. Operations and advantages in this embodiment will be described below.

When the vehicle speed V is equal to or higher than the predetermined speed Vth, the CPU 42 determines the torque command value Tm* regardless of the steering operation amount Ts* with the angle operation amount Tt* as the required torque Td, and controls the torque for the electric motor 32. On the other hand, when the vehicle speed V is lower than the predetermined speed Vth, the CPU 42 decreases a ratio at which the angle operation amount Tt1* is reflected in the required torque Td as the vehicle speed V decreases, whereby it is possible to allow a driver to be aware of road-surface state information. In this case, there is concern of the torque for the electric motor 32 decreasing excessively. Particularly, when the coefficient α is close to "1," it is difficult to control the steering torque Th to the target steering torque Th*. Therefore, the CPU 42 reflects the steering operation amount Ts* in the required torque Td when the coefficient α is set to be less.

Seventh Embodiment

Hereinafter, a seventh embodiment will be described with reference to the accompanying drawings with a focus on differences from the third embodiment.

Figure 10:
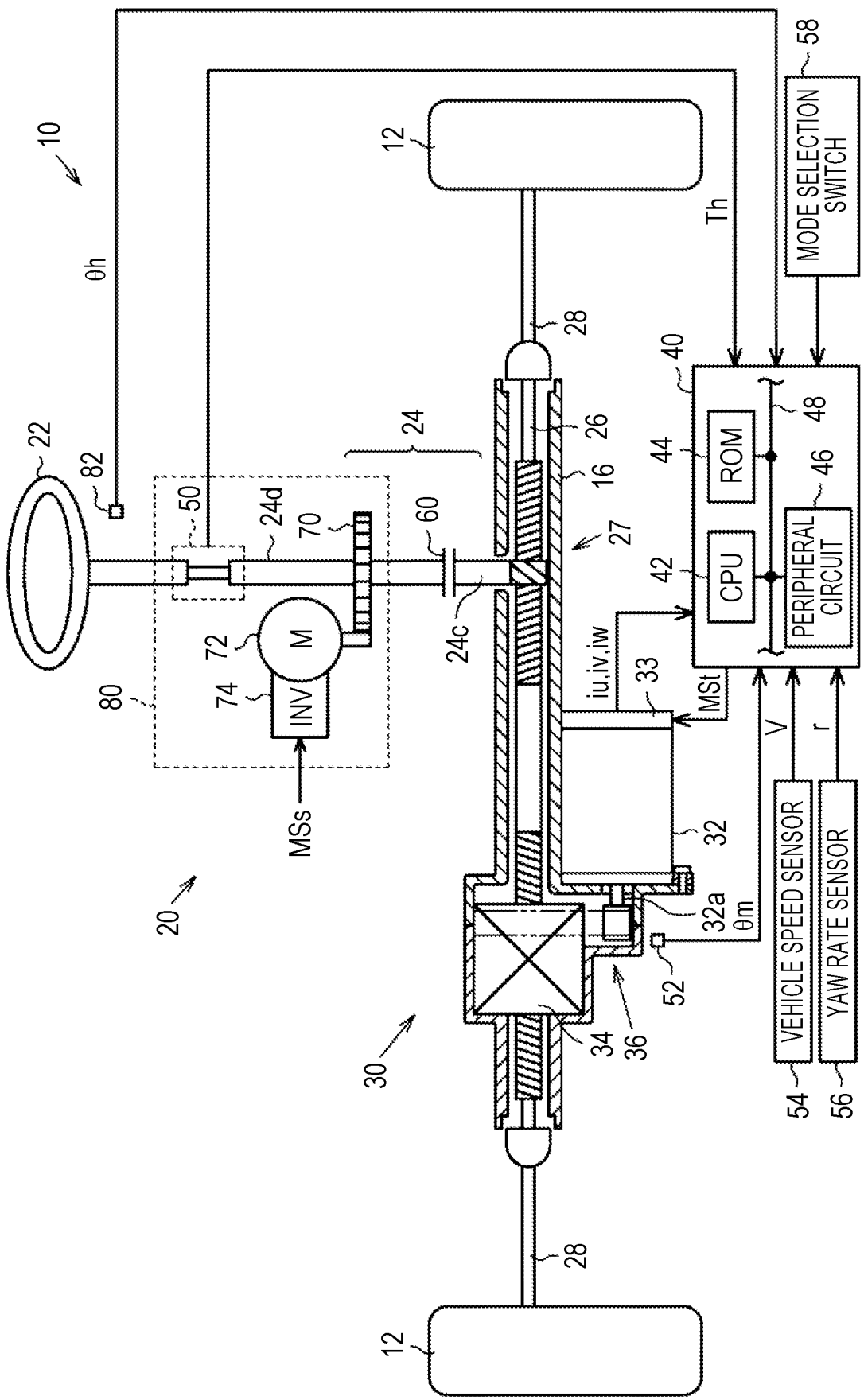
FIG. 10 is a diagram illustrating an electric power steering system according to a seventh embodiment.

FIG. 10 illustrates a configuration of an electric power steering system 10. Elements in FIG. 10 corresponding to the elements illustrated in FIG. 1 are referred to by the same reference signs for the purpose of convenience.

In this embodiment, a clutch 60 that can cut off transmission of power to and from the steering wheel 22 is provided in the pinion shaft 24c. That is, the pinion shaft 24c is connected to one end of the clutch 60 and an input shaft 24d that is connected to the steering wheel 22 is connected to the other end of the clutch 60. In this embodiment, the input shaft 24d and the pinion shaft 24c are referred to as the steering shaft 24.

Power of an electric motor 72 is applied to the input shaft 24d via a reduction gear 70. A voltage of an inverter 74 is applied to terminals of the electric motor 72. A drag force actuator 80 is constituted by the input shaft 24d, the reduction gear 70, the electric motor 72, and the inverter 74. In this embodiment, the turning control system 40 refers to a rotational angle (a steering angle θh) of the steering wheel 22 which is detected by a steering angle sensor 82.

Figure 11:
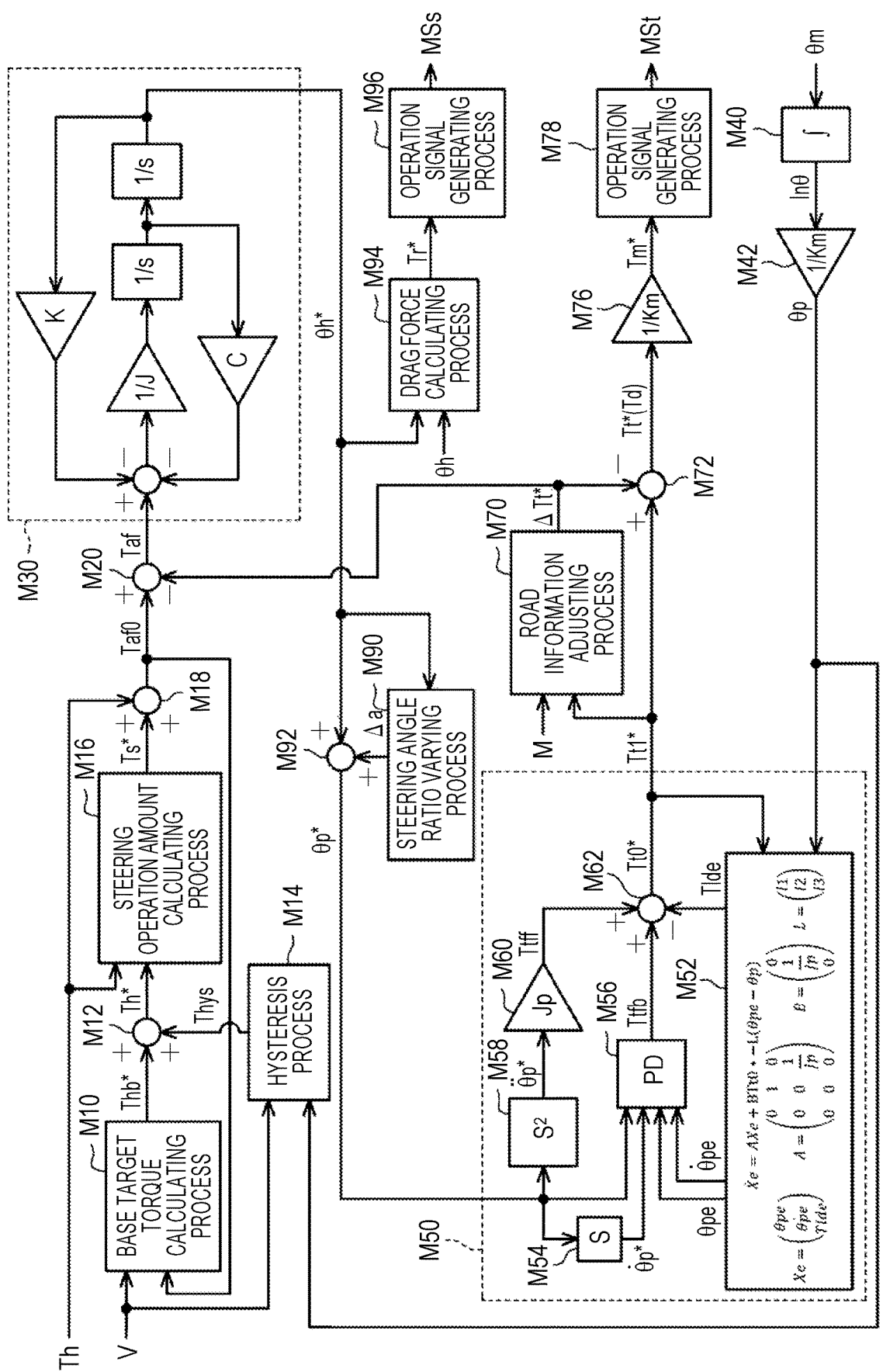
FIG. 11 is a block diagram illustrating processes which are performed by a turning control system according to the seventh embodiment.

FIG. 11 illustrates some processes which are performed by the turning control system 40 according to this embodiment. The process flow illustrated in FIG. 11 is realized by causing the CPU 42 to repeatedly execute a program stored in the ROM 44. The processes in FIG. 11 corresponding to the processes illustrated in FIG. 2 are referred to by the same step numbers for the purpose of convenience.

As illustrated in FIG. 11, in this embodiment, a command value of a steering angle (a steering angle command value θh*) instead of the pinion angle command value θp* is calculated in the normative model calculating process M30. On the other hand, a steering angle ratio varying process M90 is a process of setting an offset amount Δa for varying a steering angle ratio which is a ratio of a target value of the turning angle (the pinion angle command value θp*) to the steering angle command value θh* to be variable based on the vehicle speed V. Specifically, the offset amount Δa is set such that the change of the turning angle with the change of the steering angle is greater when the vehicle speed V is low than when the vehicle speed V is high. An addition process M92 sets the pinion angle command value θp* by adding the offset amount Δa to the steering angle command value θh*.

A drag force calculating process M94 is a process of calculating a torque command value Tr* for the electric motor 72 as an operation amount for feedback control of the steering angle θh to the steering angle command value θh*. An operation signal generating process M96 is a process of operating the inverter 74 by outputting an operation signal MSs to the inverter 74 to control the torque for the electric motor 72 to the torque command value Tr*.

In this embodiment, the steering torque compensating process M66 is not provided and the angle operation amount Tt1* which is output from the angle operation amount calculating process M50 is the same as the angle operation amount Tt0*. In this embodiment, the angle operation amount Tt* is the required torque Td. That is, in this embodiment, a torque command value Tm* is calculated from only the angle operation amount Tt*.

Correspondence

The angle command value calculating process corresponds to the normative model calculating process M30 in FIGS. 2 and 8 or the normative model calculating process M30, the steering angle ratio varying process M90, and the addition process M92 in FIG. 11. The convertible angle corresponds to the pinion angle θp. The operation process corresponds to the addition process M74, the conversion process M76, and the operation signal generating process M78 in FIGS. 2 and 8 or the conversion process M76 and the operation signal generating process M78 in FIG. 11. The adjustment process corresponds to the processes of S12, S12a, S24, or S32 to S34 and the subtraction process M72. The correction process corresponds to the subtraction process M20. The drive circuit corresponds to the inverter 33. The process corresponds to the process of S12a. The process corresponds to the process illustrated in FIG. 8 or the process illustrated in FIG. 11 when the gain G is "0." The process corresponds to the processes of S38 and S40. The process corresponds to the processes in FIGS. 3, 7, and 9. The detection process corresponds to the processes of S22 and S24. That is, when the magnitude of |γe−γ| is great, it can be considered that a sideslip is detected. The acquisition process corresponds to the process of S30. The target steering torque calculating process corresponds to the base target torque calculating process M10, the addition process M12, and the hysteresis process M14.

Other Embodiments

The embodiments can be modified as follows. The embodiments described above and modified examples described below can be combined with each other as long as no technical contradictions arise.

In the road information adjusting process M70 in FIG. 11, the process flow illustrated in FIG. 5 is performed, but the disclosure is not limited thereto. For example, the process flow illustrated in FIG. 6 may be performed. For example, the process flows illustrated in FIGS. 3 and 7 may be performed with the coefficient α set to a value less than "1" or the process flow illustrated in FIG. 4 may be performed with the coefficient β set to a value less than "1."

The correction process of correcting the magnitude of the axial force Taf which is an input of the normative model calculating process M30 to be less when the magnitude of the adjustment amount ΔTt* is great than when the adjustment amount ΔTt* is small is not limited to the examples described in the embodiments. For example, the adjustment amount ΔTt* may be superimposed on the target steering torque Th*. In this case, it is possible to reduce the magnitude of the steering operation amount Ts* and to reduce the magnitude of the axial force Taf.

For example, a sensor that detects a sideslip angle may be provided and the detection process may be configured using a process of acquiring a detection value therefrom.

The acquisition process of acquiring a driver's request signal for determining whether the magnitude of the adjustment amount ΔTt* is to increase is not limited to a process of acquiring the operation state of the mode selection switch 58. For example, a process of acquiring a signal associated with an operation state of an input device that inputs a driver's request that whether road-surface state information is to be detected regardless of the rotational speed of the electric motor may be employed.

For example, in the process flow illustrated in FIG. 3, 7, or 9, the process of S40 may be performed when the coefficient α is "1" and the process of S38 may be performed when the coefficient α is less than "1." Instead, the process of S40 may be performed when the coefficient α is equal to or greater than a prescribed value and the process of S38 may be performed when the coefficient α is less than the prescribed value.

For example, in the process flow illustrated in FIG. 4, the process of S40 may be performed when the coefficient β is "1" and the process of S38 may be performed when the coefficient β is less than "1." Instead, the process of S40 may be performed when the coefficient β is equal to or greater than a prescribed value and the process of S38 may be performed when the coefficient β is less than the prescribed value.

In the process flow illustrated in FIG. 2, the sum of the angle operation amount Tt* and the steering operation amount Ts* is used as the required torque Td, but the disclosure is not limited thereto. For example, the angle operation amount Tt* may be used as the required torque Td. In this case, the coefficient α in the process of S12 in FIG. 3, the coefficient β in the process of S24 in FIG. 4, or the coefficient α in the process of S12a in FIG. 7 is preferably set to a value less than "1."

In the process flow illustrated in FIG. 11, the angle operation amount Tt* is used as the required torque Td, but the disclosure is not limited thereto. For example, the sum of the angle operation amount Tt* and the steering operation amount Ts* may be used as the required torque Td. For example, as in the process flow illustrated in FIG. 8, "Tt*+G·Ts*" may be used as the required torque Td.

In the above-mentioned embodiments, the pinion angle command value θp* or the steering angle command value θh* is calculated using the axial force Taf as an input, but the disclosure is not limited thereto and, for example, the steering operation amount Ts* may be used as an input. In the above-mentioned embodiments, the pinion angle command value θp*or the steering angle command value θh* is calculated based on Expression (c1) or the like using the axial force Taf as an input, but a logic (model) for calculating the pinion angle command value θp*or the steering angle command value θh* is not limited thereto.

For example, in the process flow illustrated in FIG. 11, the steering angle ratio varying process M90 and the addition process M92 may be deleted and the output of the normative model calculating process M30 may be used as the steering angle command value θh* or the pinion angle command value θp*.

In the above-mentioned embodiments, the disturbance observer is constituted by a simple model in which the torque acting on the turning wheels 12 is balanced with a torque proportional to the angular acceleration of the turning angle, but the disclosure is not limited thereto. For example, the disturbance observer may be constituted by a model in which the torque acting on the turning wheels 12 is balanced with the sum of a torque proportional to the angular acceleration of the turning angle and a torque proportional to the angular velocity of the turning angle.

A method of calculating the estimated disturbance torque Tlde is not limited to the examples described in the embodiments. For example, in the process flow illustrated in FIG. 2, the estimated disturbance torque Tlde may be calculated by subtracting the angle operation amount Tt*, the steering operation amount Ts*, and the steering torque Th from a value obtained by multiplying the second-order time differential value of the pinion angle command value θp* or the second-order time differential value of the pinion angle θp by the inertia coefficient Jp.

In the above-mentioned embodiments, the feed-forward operation amount Ttff is calculated based on the second-order time differential value of the pinion angle command value θp*, but the disclosure is not limited thereto and, for example, the feed-forward operation amount Ttff may be calculated based on the second-order time differential value of the pinion angle θp or the second-order time differential value of the estimated value θpe.

In the above-mentioned embodiments, the feed-forward term is calculated by modeling the electric power steering system 10 using a simple model in which the torque acting on the turning wheels 12 is balanced with a torque proportional to the angular acceleration of the turning angles, but the disclosure is not limited thereto. For example, the feed-forward term may be calculated using a model in which the torque acting on the turning wheels 12 is balanced with the sum of a torque proportional to the angular acceleration of the turning angles and a torque proportional to the angular velocity of the turning angles. This can be realized, for example, using the sum of a value obtained by multiplying the second-order time differential value of the pinion angle command value θp* by the inertia coefficient Jp and a value obtained by multiplying the first-order time differential value of the pinion angle command value θp* by the stickiness coefficient Cp as the feed-forward operation amount Ttff. Here, the stickiness coefficient Cp of a proportionality coefficient of the angular velocity is different from the stickiness coefficient C which is used in the normative model calculating process M30 in purpose thereof, and is preferably obtained by modeling actual behavior of the electric power steering system 10 with maximum accuracy.

A feedback control amount out of the inputs of the feedback term calculating process M56 is not limited to the estimated value θpe or the first-order time differential value thereof. For example, the pinion angle θp or the time differential value thereof may be used instead of the estimated value θpe or the first-order time differential value thereof.

The feedback term calculating process M56 is not limited to the process of outputting the sum of the output values of a proportional element and a differential factor. For example, the output value of a proportional factor may be output or, for example, an output value of a differential factor may be output. For example, a process of outputting the sum of at least one of the output value of a proportional factor and the output value of a differential factor and the output value of an integral factor may be employed. When the output value of an integral factor is used, the disturbance observer is preferably deleted. Above all, when the output value of an integral factor is not used, the disturbance observer is not necessarily used.

In the above-mentioned embodiments, the pinion angle θp is used as the convertible angle, but the disclosure is not limited thereto. For example, the turning angle of the turning wheels may be used.

In the above-mentioned embodiments, the steering operation amount Ts* is converted to a torque for the steering shaft 24, but the disclosure is not limited thereto. For example, it may be converted to the torque for the electric motor 32. In this case, for example, the sum of a value obtained by dividing the steering torque Th by the reduction gear ratio Km and the steering operation amount Ts* may be used as the axial force Taf0 or the sum of a value obtained by multiplying the steering operation amount Ts* by the reduction gear ratio Km and the steering torque Th may be used as the axial force Taf0.

In the above-mentioned embodiments, the angle operation amount Tt* is converted to the torque for the steering shaft 24, but the disclosure is not limited thereto. For example, it may be converted to the torque for the electric motor 32. Here, for example, when the steering operation amount Ts* is converted to the torque for the steering shaft 24, the sum of a value obtained by multiplying the angle operation amount Tt* by the reduction gear ratio Km and the steering operation amount Ts* may be used as the required torque Td.

The base target torque calculating process is not limited to the process of calculating the base target torque Thb* based on the axial force Taf0 and the vehicle speed V. For example, a process of calculating the base target torque Thb* based on only the axial force Taf0 may be employed.

The process of correcting the base target torque Thb* using the hysteresis correction amount Thys is not necessary. The turning control system is not limited to a system that includes the CPU 42 and the ROM 44 and performs software processes. For example, a dedicated hardware circuit (for example, an ASIC) that performs at least a part of the software processes performed in the above-mentioned embodiments in hardware may be provided. That is, the turning control system may have at least one of the following configurations of (a) to (c). (a) A processor that performs all the processes in accordance with a program and a program storage device such as a ROM that stores the program are provided. (b) A processor that performs some of the processes in accordance with a program, a program storage device, and a dedicated hardware circuit that performs the other processes are provided. (c) A dedicated hardware circuit that performs all the processes is provided. Here, the number of software processing circuits including a processor and a program storage device or the number of dedicated hardware circuits may be two or more. That is, the processes has only to be performed by a processing circuit including at least one of one or more software processing circuits and one or more dedicated hardware circuits.

The electric motor is not limited to an SPMSM but may be an IPMSM or the like. The electric motor is not limited to a synchronous machine but may be an induction machine. In addition, for example, the electric motor may be a direct-current electric motor with a brush. In this case, an H-bridged circuit may be employed as the drive circuit.

The turning actuator is not limited to the examples described in the embodiments. For example, a so-called dual pinion type including a second pinion shaft that transmits power of the electric motor 32 to the rack shaft 26 separately from the pinion shaft 24c may be employed. For example, a configuration in which the output shaft 32a of the electric motor 32 is mechanically connected to the steering shaft 24 may be employed. In this case, the turning actuator shares the steering shaft 24 or the rack and pinion mechanism 27 with the steering mechanism.

For example, in FIG. 10, the input shaft 24d may be mechanically connected to the pinion shaft 24c via a gear ratio varying mechanism that varies a gear ratio instead of the clutch 60. In this case, the same processes as described for a steer-by-wire type can also be realized.

What is claimed is:

1. A turning control system for operating a turning actuator that includes an electric motor incorporated therein and turns turning wheels, the turning control system comprising:
a processor configured to:
calculate a steering operation amount, which is convertible to a torque required for the electric motor for turning the turning wheels, to convert a steering torque input by a driver to a target steering torque by feedback control;
calculate an angle command value of a convertible angle which is convertible to a turning angle of the turning wheels based on the steering operation amount;
calculate an angle operation amount, which is convertible to the torque required for the electric motor, for converting the convertible angle to the angle command value by feedback control;
operate a drive circuit of the electric motor to control torque of the electric motor;
adjust a magnitude of a control value which is subtracted from the angle operation amount and input the angle operation amount with the control value subtracted to operate the drive circuit of the electric motor; and
in response to the angle command value being calculated, correct a magnitude of an input to be less given that the magnitude of the control value is a first value, as compared to a case where the magnitude of the control value is a second value smaller than the first value, using a normative model.

2. The turning control system according to claim 1, wherein adjusting the magnitude of the control value includes adjusting a value obtained by dividing an angle operation amount used to operate the drive circuit by the calculated angle operation amount in a range of from 0 to 1.

3. The turning control system according to claim 1, wherein the angle operation amount is calculated based on a sum of a feed-forward operation amount for feed-forward control to the angle command value and an estimated disturbance torque which is an output of a disturbance observer based on a difference between the convertible angle and the angle command value, and
wherein the magnitude of the input is adjusted, in response to the angle command value being calculated, based on a value obtained by subtracting an estimated disturbance torque used to operate the drive circuit from the estimated disturbance torque used to calculate the angle operation amount.

4. The turning control system according to claim 1, wherein operating the drive circuit includes controlling a torque of the electric motor based on the angle operation amount regardless of the steering operation amount.

5. The turning control system according to claim 1, wherein calculating the angle command value includes changing a relationship of an output with the input based on the magnitude of the control value.

6. The turning control system according to claim 1, wherein adjusting the magnitude of the input includes decreasing the magnitude of the control value in response to determining that a vehicle speed is a first vehicle speed value in comparison with a case in which the vehicle speed is determined to be a second vehicle speed value lower than the first vehicle speed value.

7. The turning control system according to claim 1, wherein the processor is configured to:
detect a sideslip of a vehicle, and
wherein adjusting the magnitude of the input includes increasing the magnitude of the control value in response to detecting the sideslip, in comparison with a case in which the sideslip is not detected.

8. The turning control system according to claim 1, wherein the processor is configured to acquire a request signal from a driver, and
wherein adjusting the magnitude of the input includes increasing the control value based on the acquired request signal.

* * * * *